United States Patent [19]

Bolding, Jr.

[11] 4,286,664
[45] Sep. 1, 1981

[54] POSITIVE SEAL FLOAT COLLAR

[75] Inventor: Benson H. Bolding, Jr., St. Martinville, La.

[73] Assignee: Aztec Tools, Inc., Lafayette, La.

[21] Appl. No.: 70,348

[22] Filed: Aug. 28, 1979

[51] Int. Cl.³ ............... E21B 34/08; F16K 15/04
[52] U.S. Cl. ................... 166/325; 137/537; 137/DIG. 4
[58] Field of Search ............... 166/325–329, 166/315; 137/537, 539, 541, DIG. 4

[56] References Cited

U.S. PATENT DOCUMENTS

| | | | |
|---|---|---|---|
| 1,574,537 | 2/1926 | Burch | 166/325 X |
| 1,631,509 | 6/1927 | Baker | 166/325 X |
| 2,092,822 | 9/1937 | West | 166/325 X |
| 2,161,282 | 6/1939 | Crowell | 166/327 X |
| 2,202,461 | 5/1940 | Nash | 166/327 X |
| 2,286,841 | 6/1942 | Smith | 137/539 X |
| 3,006,415 | 10/1961 | Burns et al. | 166/327 X |
| 3,086,591 | 4/1963 | Sexton | 166/325 X |
| 3,123,517 | 3/1964 | Davis | 166/325 X |
| 3,385,372 | 5/1968 | Knox | 166/325 |

FOREIGN PATENT DOCUMENTS

| | | | |
|---|---|---|---|
| 660909 | 7/1929 | France | 137/537 |
| 622502 | 5/1949 | United Kingdom | 137/537 |

Primary Examiner—Stephen J. Novosad
Attorney, Agent, or Firm—Guy E. Matthews

[57] ABSTRACT

A device for insuring a positive fluid seal between a float collar valving element and valve seat therein is disclosed. The device comprises a rubberlike tension strap or compression steel spring positioned within the float collar valve assembly for urging the valving element against the upper valve seat. Fluid pressure from above the valve assembly will overcome the force exerted on the valving element by the urging device and permit fluid to flow in a downwardly direction through the float collar valve assembly. However, when this fluid pressure above the float collar is reduced, the urging device overcomes the force exerted thereby and again urges the valving element in positive sealing engagement with the upper valve seat to preclude flow of fluid in an upwardly direction back through the float collar valve assembly.

2 Claims, 3 Drawing Figures

POSITIVE SEAL FLOAT COLLAR

FIELD OF THE INVENTION

This invention relates generally to casing float collars, float shoes, stab-in shoes and stab-in collars (latch-in and screw-in), and more specifically to a device for insuring a positive seal between the valving element and valve seat within the float collar, etc., to prevent the flow of fluid in an upward direction through the float collar.

Casing float collars and float shoes are well known in the art and are used extensively in casing running and cementing operations in the downhole wellbore. These shoes and collars are also run on conductor casing, protection strings, intermediate strings and liners, in addition to production casing. After a well is drilled to below the oil production layer, or strata, what is termed "production casing" is run down inside the wellbore to the bottom. Initially, the wellbore is typically filled with a mixture of water, oil, drilling mud, etc. It is desired that this fluid mixture not enter the production casing as the casing is lowered and positioned within the wellbore. To effect this, a guide shoe or float shoe is attached to the first length of casing to be lowered into the wellbore. This guide shoe or float shoe has a rounded nose to guide the casing around obstructions, ledges, etc. within the wellbore. Some guide shoes or float shoes are equipped with a float valve device that closes under pressure from within the wellbore to prevent the casing from filling with this fluid mixture as the casing is lowered down into the wellbore. Occasionally, combination float collars and guide shoes are used as multi-stage back pressure valves to more effectively perform the desired function.

With the casing in place at the bottom of the wellbore, the next step is to permanently attach it to the hole interior. This is accomplished by filling the annular space between the wellbore and casing with cement, the primary functions of which are:

(1) to restrict fluid movement between formations and to the surface;

(2) to provide support for the casing;

(3) to prevent pollution of fresh water formations; and (4) to prevent casing corrosion.

Cement is placed within this annular space by pumping the cement down inside the casing, through the system of float collars and float shoes, out the bottom of the casing and then back up the annular space between the casing and wellbore. Thus, primary functions of the float collar and float shoe are to preclude the entry of the fluid mixture originally in the wellbore from entering the casing and diluting or otherwise contaminating the casing cement introduced at the top of the casing string, preventing a possible blowout through the casing, and provides a means of floating a portion of the casing to bottom of deep wellbores.

The internal ball valve assembly of a typical float collar or float shoe has a free-floating ball within a valve chamber, such ball being supported in such a manner to permit fluid flow from the top in a downward direction through the float collar ball valve. Typically, the ball valve is in the upper portion of the valve chamber, due to the differential pressure below the ball valve. This is the position of the float ball as casing is run into the hole. After casing is run, mud is pumped down through the hole to condition the hole and to insure that no foreign objects are inside the casing, prior to mixing and pumping down the cement or displacing the cement outside the casing in the annular space. After cement is mixed, a top plug is used to displace or pump the cement out the casing. This top plug is pumped down and contacts the top of the float collar. Pressure is then released in a manner to seat the ball in the upper float housing. Frequently, a lack of differential pressure below the ball valve, a lack of proper bleed back, or similar condition, prevents the float ball from rising into the upper housing. In this instance, the ball valve does not seat, and pumps must be utilized to maintain pressure above the top plug to prevent cement from back flowing into the casing. This condition results in a substantial loss in terms of man-time and rig-time, not to mention the sizable dollar loss incurred. In addition, this excessive pressure on the inside of the casing, when released, creates a micro-annulus between the wall of the wellbore and the outside of the casing, potentially resulting in expensive squeeze work required on the cementing job.

It is therefore an object of the present invention to provide a device for insuring that the valving element ball within the float valve effects a positive seal against the upper valve seat.

SUMMARY OF THE INVENTION

The present invention is directed to a device for use with a casing float collar or float shoe to urge the valving element in sealing engagement with the internal valve seat so as to insure a positive seal therebetween and prevent the flow of fluid in an upwardly direction through the float collar or float shoe. The preferred embodiment of the device comprises a support structure mounted with the internal float collar cement so as to provide a means for supporting a rubber-like tension band or strap for urging the float collar ball valving element into sealing engagement with a fluid seal in the upper portion of the float collar valve chamber to form an effective, positive seal therebetween.

BRIEF DESCRIPTION OF THE DRAWINGS

The features and advantages of this invention will become more apparent of those skilled in the art from the following detailed description of the invention together with the drawings in which.

DETAILED DESCRIPTION OF THE INVENTION

Figure 1:
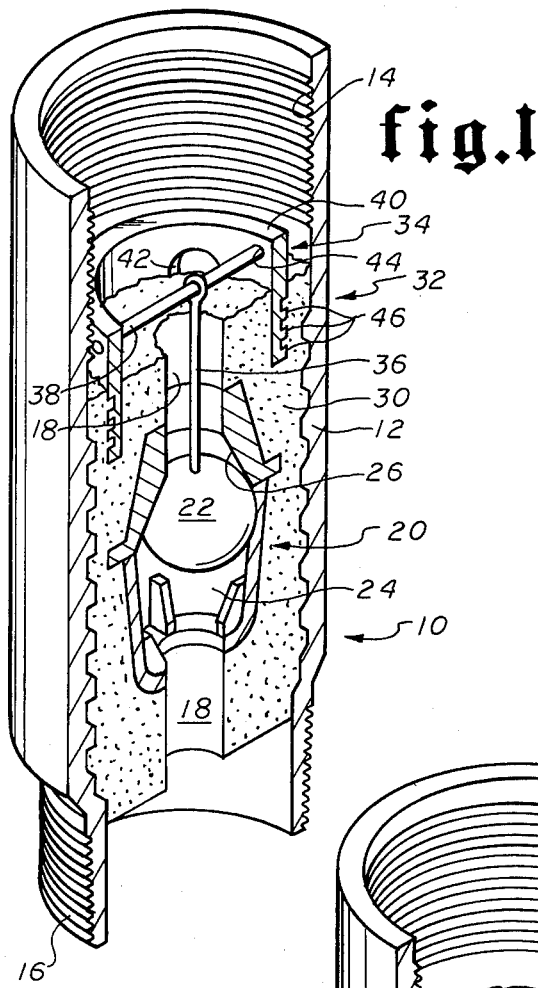
FIG. 1 is a vertical sectional view of a casing float collar incorporating the preferred embodiment of the present invention.

Turning now to the drawings, and more particularly to FIG. 1, a float collar is shown generally illustrated at 10. The float collar 10 comprises a main body portion 12, said body portion including internal threads at its upper end for threadedly engaging a section of pipe, and external threads 16 at the lower end thereof, likewise for threadedly engaging a section of pipe. An internal flow channel or passage 18 is located vertically within the float collar 10 in order that drilling mud, casing cement or other fluid may flow through the collar. A ball valve assembly 20 is positioned approximately midway through this flow channel 18 for regulating the flow of fluid in either direction through the float collar 10. The ball valve assembly 20 comprises a ball valve or float valve 22 suspended within a chamber 24 of the assembly. The ball valve 22 acts against an upper seat 26 to restrict or preclude flow of fluid through the internal flow chamber 18 in an upperward direction, in response to differential fluid pressure above and below the ball valve assembly. This seat 26, is conical shaped and may be made of neoprene or other material suitable to withstand the corrosive effects of drilling mud and casing cement, yet retain its resiliency and positive sealing capability. The ball valve assembly 20 is set in float collar internal cement 30 to permanently mount it within the float collar 10.

As shown in FIG. 1, a preferred embodiment of the valve member urging device 32 is shown comprising a support means portion 34 and a resilient means portion 36 attached thereto and depending vertically therefrom. In this preferred embodiment, the support portion 34 comprises a metal cross bar 38 mounted with and supported by a cylindrical shaped sidewall portion 40 embedded into the float valve internal cement 30. This sidewall portion 40 comprises a metal ring or band with optional perforations 42 therein for permitting fluid to flow therethrough. The metal crossbar 38 and cylindrical sidewall portion 40 are welded together at 44, thereby adding rigidity and structural stability to the support means portion 34.

The preferred embodiment of the resilient means portion 36 comprises a vulcanized rubber-like tension cable or strap, having one end thereof permanently embedded into the ball valving element 22 and the other end thereof mounted with the metal cross bar 38 directly above and at the geometric center of the float collar float channel 18 so that the cable constantly urges the ball valving element upwardly against the valve seat 26 to effect a positive seal therebetween. This resilient means 36 is sufficiently strong to retain the ball valving element 22 in positive sealing relation with the valve seat 26 under pressure from the weight of a substantial amount of drilling mud or casing cement within the drill string above the float collar 10 and maintain a positive seal between the ball valving element and the upper valve seal.

As best shown in FIG. 1, the cylindrical sidewall 40 of the support means portion 34 is embedded into the float valve internal cement 30 as the float collar or float shoe 10 is fabricated at the manufacturing facility. Sidewall portion 40 includes retaining flanges 46 on the exterior thereof which retain the support means portion 32 in position, while additionally, imparting additional structural stability to both the support means portion and the internal cement portion, the support means portion becoming an integral part thereof.

Figure 2:
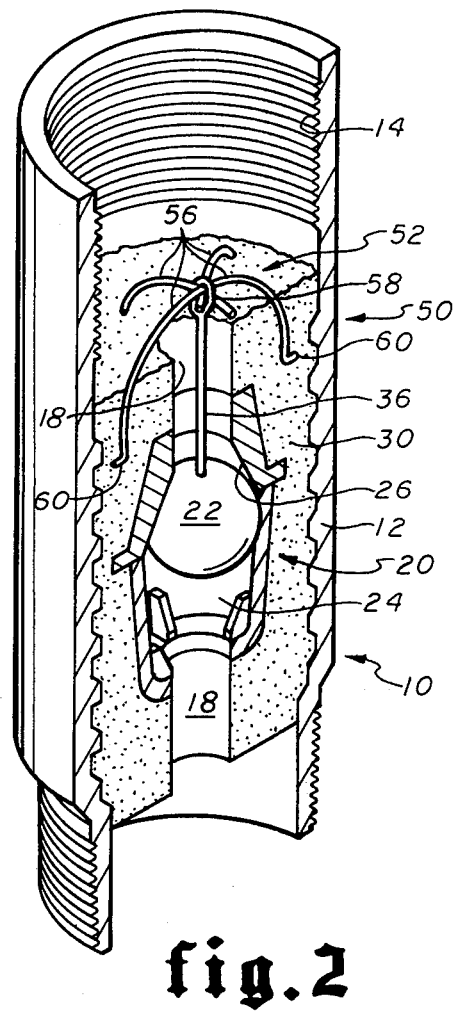
FIG. 2 is a vertical sectional pictorial view of a casing float collar incorporating an alternative embodiment of the present invention.

An alternative embodiment of the valve member urging device 50 is shown in FIG. 2, comprising a support means portion 52 and a resilient means portion 36 attached thereto and depending vertically therefrom, as in the preferred embodiment. In this alternative embodiment, the support portion 52 comprises a generally semi-spherical shaped cage formed of a plurality of metal rods 56 or the like welded or otherwise permanently bonded together at an apex 58. The resilient means 36, as in the preferred embodiment, comprises a vulcanized rubber-like tension cable or strap permanently embedded into the ball valving element 22 at one end and mounted with the support means apex 58 at the other end thereof above at the geometric center of the float collar internal float channel 18. As in the preferred embodiment, this resilient means portion 36 is sufficiently strong to urge the ball valving element 22 in positive sealing relation with the valve seat 26 under pressure from the weight of a substantial amount of drilling mud or casing cement within the drill string above the float collar 10 and still maintain a positive seal between the ball valving element and the upper valve seal.

As best shown in FIG. 2, the alternative embodiment of the support means portion 52 includes a plurality of feet or pads 60, one each mounted with each of the support means metal rods 56 at the end opposite the apex 58. These feet or pads 60 serve the same purpose as the retaining flanges 46 in the preferred embodiment to retain the support means portion 52 in position and prevent it from jarring loose under bombardment impact from large rocks or other heavy objects occasionally found in drilling mud or casing cement, while contemporaneously therewith, imparting additional structural stability to both the support means 52 and the internal cement 30.

Figure 3:
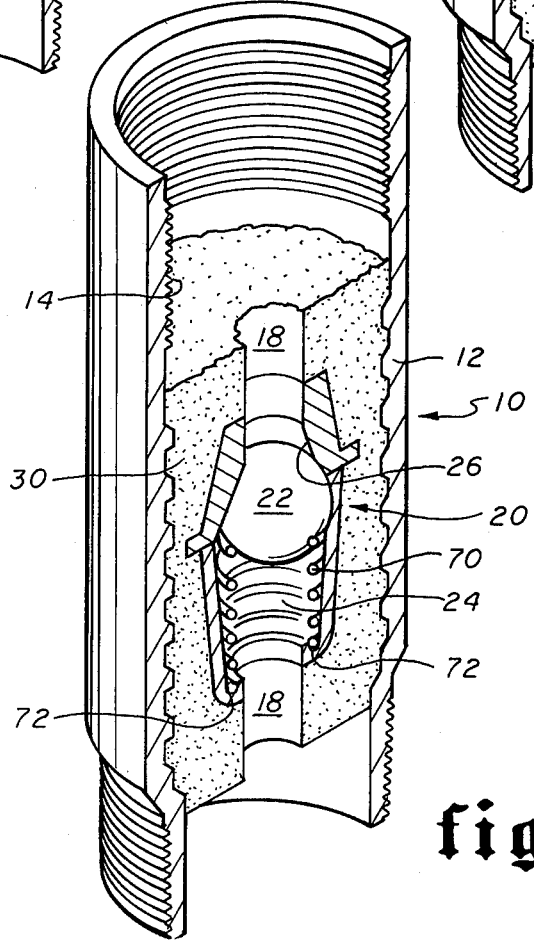
FIG. 3 is a vertical sectional pictorial view of a casing float collar incorporating a second alternative embodiment of the present invention.

A second alternative embodiment 70 of the present invention is shown in FIG. 3 consisting of a compression metal spring positioned within the valve chamber 24 below the ball valving element 22 so as to urge the element upwardly against the valve seat 26 to effect a positive seal therebetween. The lower end of the compression metal spring 70 rests in a spring retaining groove 72 located in the lower portion of the valve chamber 24.

As shown in FIG. 3, the diameter of the compression metal spring 70 is greater than the lower portion of the float collar chamber 24 in order that the lower portion of the chamber may provide support for the compression spring 70 and may provide the retaining groove 72 for receiving the spring and maintaining the spring in linear alignment with the central axis of the valve chamber and internal flow channel 18 to insure a positive, uniform seal between the ball valving element 22 and the upper valve seat 26 by urging the valving element in an upward direction along the central axis of the chamber concentric with the conical shaped valve seat.

In operation, a float collar or float shoe 10 is threadedly attached between two sections of casing being lowered into a wellbore. The float valve serves as a back-pressure valve to retain pressure below the valve (outside the casing string) when the valve is in the closed position, thereby preventing outside fluid from entering the casing as the casing is lowered into the wellbore. This outside pressure permits the casing to "float" into the wellbore, depending on the amount of fluid placed inside the casing string as it is filled from the surface (above the ball valve). When the casing has been run to the desired depth, circulation is established through the casing and the float valve by pumping casing cement, for example, down inside the casing string and overcoming the fluid pressure below the ball valve (outside the casing string).

The ball valve in the float collar also serves as a check-valve in the casing string to prevent backflow of cement that has been pumped outside the string through the valve into the annulus between the casing and the wellbore. This check valve feature also serves to prevent a blowout through the casing, in the event high pressure formations are exposed in the open wellbore.

It will readily be appreciated that in order for the float collar or float shoe 10 to function correctly as a back-pressure valve to prevent fluid existing within the wellbore from entering the casing as the casing is lowered into the wellbore, the ball valving element 22 must immediately and effectively seal against the upper valve seat 26. The present invention accomplishes this objective by providing a constant force to urge ball valving element 22 against the upper seat 26 even under pressure from a column of fluid within the casing string above the float collar valve assembly. By so doing, the present invention operates to prevent existing fluid within the wellbore from mixing with and otherwise contaminating drilling mud or casing cement introduced into the casing string.

When the casing has been run to the desired depth, casing cement is introduced into the casing string at the top thereof and pumped down through the string, through the float collar and/or float shoe 10 and into the annulus between the casing string and wellbore in order to set the casing within the wellbore. During this operation, the pressure exerted by the weight of the casing cement within the drill string and the additional pressure from the pump supplying the casing cement will overcome the force of the valve member urging device, thereby unseating the valve element 22 from the valve seat 26 and permitting the casing cement to freely pass through the float collar and/or float shoe 10 and into the annulus between the casing string and wellbore.

When a sufficient amount of casing cement has been pumped through the casing string and up the annulus surrounding the string, pressure from the casing cement pump is reduced, thereby permitting the resilient means 36 or 70 to urge the ball valve member 22 upward in positive sealing engagement with the upper valve seat 26 to prevent casing cement or other fluid within the wellbore annulus from backing up into the casing string under its own weight.

The present invention has been described in connection with a casing float collar, used intermediate sections of a casing string. The present invention is equally applicable for use with a float shoe without detracting from the spirit of the invention as set forth in the appended claims.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A float collar for use in well preparation and production of hydrocarbons, comprising:
    (a) a longitudinal body mounted between tubular casing joints, said body having a longitudinal passageway therethrough for enabling communication of said joints;
    (b) a valve assembly positioned within said body having a ball valving element in an upper conical valve seat positioned in said passage; and
    (c) a resilient strap supported above said valve assembly permanently connected to said ball valving element for urging said ball valving element in positive sealing engagement against said conical valve seat to preclude fluid flow in an upward direction.

2. A float collar, which comprises:
   a tubular body adapted to be mounted in a casing string, said tubular body having a flow channel therethrough;
   a downwardly facing conical valve seat positioned in said flow channel;
   a ball valving element axially movably positioned in said flow channel beneath said conical valve seat;
   a resilient strap permanently connected at one end thereof to said ball valving element;
   and means for supporting the other end of said resilient strap above said conical valve seat to urge the ball valving element into engagement with said conical valve seat, said supporting means including a hemispherically shaped cage including a plurality of rods supported mounted in said tubular body.

* * * * *